US009081978B1

(12) United States Patent
Connolly et al.

(10) Patent No.: US 9,081,978 B1
(45) Date of Patent: Jul. 14, 2015

(54) STORING TOKENIZED INFORMATION IN UNTRUSTED ENVIRONMENTS

(71) Applicant: AMAZON TECHNOLOGIES, INC., Reno, NV (US)

(72) Inventors: Jeremiah John Connolly, Seattle, WA (US); Dennis Marinus, Dublin (IE)

(73) Assignee: Amazon Technologies, Inc., Reno, NV (US)

( * ) Notice: Subject to any disclaimer, the term of this patent is extended or adjusted under 35 U.S.C. 154(b) by 215 days.

(21) Appl. No.: 13/905,815

(22) Filed: May 30, 2013

(51) Int. Cl.
*G06F 21/00* (2013.01)
*G06F 21/62* (2013.01)
*G06F 21/10* (2013.01)
*H04L 29/06* (2006.01)

(52) U.S. Cl.
CPC ............. *G06F 21/62* (2013.01); *G06F 21/10* (2013.01); *H04L 63/0428* (2013.01)

(58) Field of Classification Search
CPC ...................................................... G06F 21/62
USPC ............................................................ 726/30
See application file for complete search history.

(56) References Cited

U.S. PATENT DOCUMENTS

| | | | | |
|---|---|---|---|---|
| 5,414,650 | A * | 5/1995 | Hekhuis ....................... | 708/203 |
| 8,458,487 | B1 * | 6/2013 | Palgon et al. ................. | 713/185 |
| 2006/0116862 | A1 * | 6/2006 | Carrier et al. ..................... | 704/1 |
| 2009/0249082 | A1 * | 10/2009 | Mattsson ....................... | 713/193 |
| 2011/0154466 | A1 * | 6/2011 | Harper et al. ..................... | 726/9 |
| 2011/0213807 | A1 * | 9/2011 | Mattsson ....................... | 707/802 |
| 2012/0203700 | A1 * | 8/2012 | Ornce et al. ..................... | 705/67 |
| 2012/0278897 | A1 * | 11/2012 | Ang et al. ....................... | 726/26 |
| 2012/0324555 | A1 * | 12/2012 | Chambers et al. ................ | 726/6 |
| 2013/0132411 | A1 * | 5/2013 | Pfeifle ........................... | 707/758 |
| 2013/0191289 | A1 * | 7/2013 | Cronic et al. ................... | 705/67 |
| 2013/0212666 | A1 * | 8/2013 | Mattsson et al. ................. | 726/9 |
| 2014/0283139 | A1 * | 9/2014 | Anand ............................ | 726/30 |

* cited by examiner

*Primary Examiner* — Hadi Armouche
*Assistant Examiner* — Shahriar Zarrineh
(74) *Attorney, Agent, or Firm* — Lindauer Law, PLLC

(57) ABSTRACT

Techniques are described for tokenizing information to be stored in an untrusted environment. During tokenization, one or more strings in a file or data stream are replaced with a token. The token may be generated as a random number or a counter, such that the replaced string may not be derived based on the token. Token-to-string mapping data may be stored in a trusted environment, and the tokenized information may be stored in the untrusted environment. Users may search the tokenized information based on non-sensitive search terms present in a whitelist that is accessible from the untrusted environment, the whitelist providing a token-to-string mapping for the non-sensitive terms. The search results may be provided as redacted information, in which the non-sensitive strings have been detokenized based on the whitelist while the sensitive strings remain tokenized.

20 Claims, 11 Drawing Sheets

STORING TOKENIZED INFORMATION IN UNTRUSTED ENVIRONMENTS

BACKGROUND

Businesses or other organizations that operate online may process and store large amounts of data associated with users, customers, products, services, vendors, finances, or operations generally. In some cases, the stored data may include sensitive data describing financial accounts, personal identification information, private health information, and so forth. Businesses or other organizations implement processes and standards to ensure that such information is kept confidential and is not accessible by the general public or by unauthorized personnel within the business or other organization.

Figure 1:
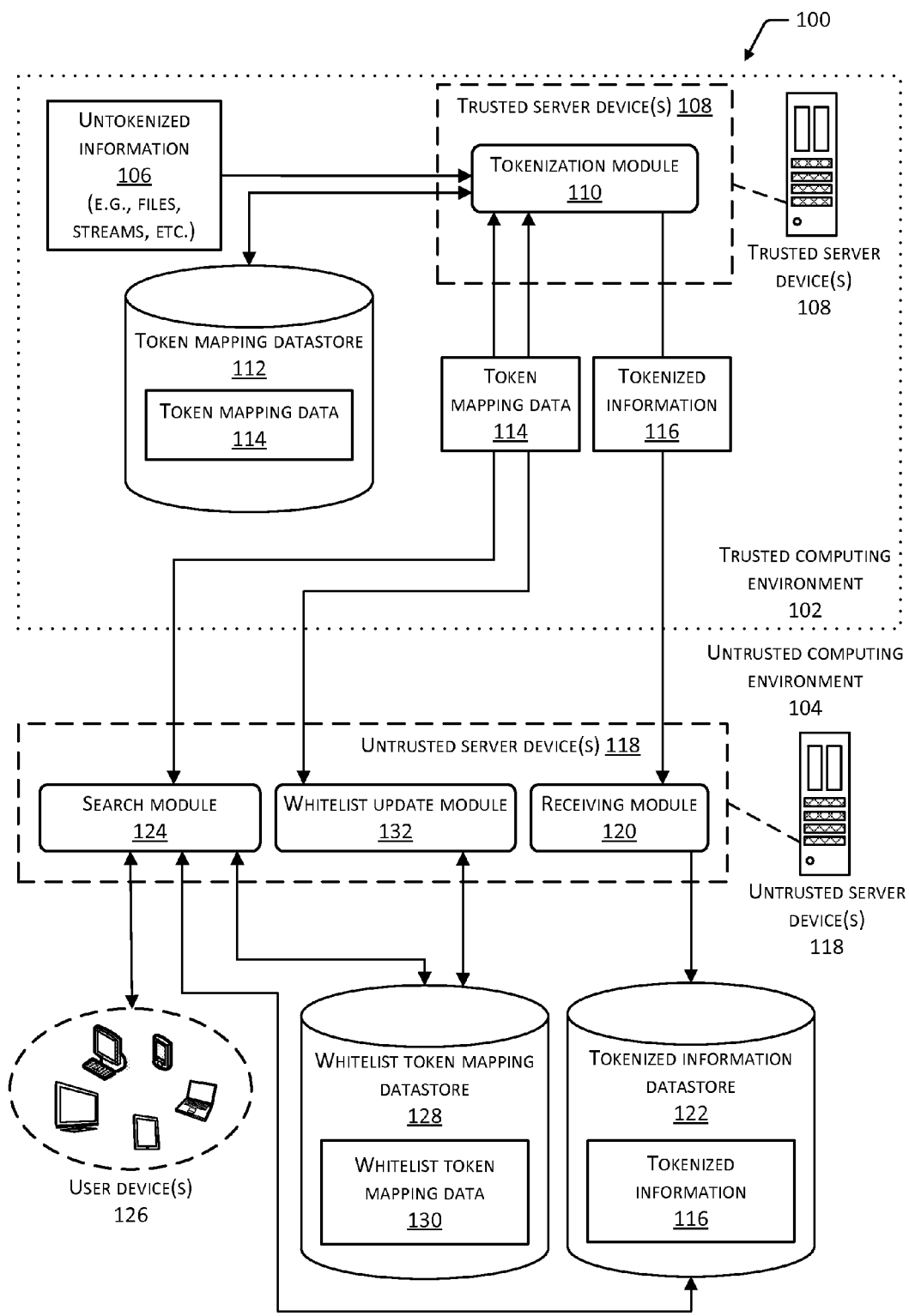
FIG. 1 depicts an environment including a trusted computing environment and an untrusted computing environment, in which untokenized information generated in the trusted computing environment may be tokenized for storage in the untrusted computing environment.

Certain implementations and embodiments are described in more detail below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for generating tokenized versions of information to be stored in an untrusted computing environment, and for searching a tokenized information datastore to retrieve partly detokenized versions of the information in the untrusted computing environment. In some computing environments, access to sensitive information such as credit card and bank account numbers may be restricted to a trusted computing environment that is accessible to a limited number of authorized personnel. Other information that is frequently used for internal analysis and processing, such as log files or log data streams generated by executing processes, may be stored in an untrusted computing environment that is more broadly accessible.

However, in some cases sensitive information may be inadvertently written into files or streams that are designed or intended to be free of such data, or that are inappropriate for such data. For example, user interface problems may cause customers or other users to enter sensitive information such as a credit card number into the wrong field, and improper parsing or processing of the entered data may cause the sensitive information to be written to an inappropriate file. As another example, corrupt messages or programmatic bugs may cause improper parsing of sensitive information, such that the sensitive information is written to an inappropriate file. Further, sensitive information may be written to an inappropriate file during debugging exercises, system crashes, and so forth.

To protect sensitive information that may inadvertently leak into inappropriate files or streams, while still providing convenient access to such files and streams in an untrusted computing environment, implementations provide for a tokenization in which each word or string in an untokenized file or stream is replaced with a token. In some cases, the token may be a random number, a pseudo-random number, or a counter, or may be otherwise generated such that the replaced string may not be derived from the token. Token mapping data that associates each replaced string with a corresponding token may be stored in the trusted computing environment, and the tokenized files or tokenized streams may be stored in the untrusted computing environment. Users may search for the tokenized files or tokenized streams stored in the untrusted computing environment based on non-sensitive search terms, through the use of whitelist token mapping data that provides a token-to-string mapping for non-sensitive strings. The search results may be presented as at least partly detokenized information (e.g., redacted versions of the original files or streams), in which the tokens corresponding to the original non-sensitive strings are replaced with the original strings while the sensitive strings remain tokenized and thus unreadable by unauthorized personnel.

As used herein, sensitive data or sensitive information may refer to any information that is critical, personal, private, or otherwise not intended to be accessible by the generic public or by all personnel within a business or organization. For example, sensitive data may include financial information for customers or other users, such as bank account numbers and routing numbers, credit card numbers or other credit account information, and so forth. Sensitive data may also include personal identification information for customers or other users, such as social security numbers, addresses, telephone numbers, and the like. Sensitive data may also include health care or health status information for customers or other users.

FIG. 1 depicts an environment 100 in which implementations may operate. The environment 100 includes a trusted computing environment 102 and an untrusted computing environment 104. The trusted computing environment 102 may be configured to ensure the security and secrecy of sensitive information that is stored in one or more datastores in the trusted computing environment 102, or processed by one or more computing devices in the trusted computing environment 102.

As used herein, the trusted computing environment 102 refers to an environment of one or more computing devices, data storage devices, network infrastructure components, or other hardware or software components. The trusted computing environment 102 is at least partly segregated from the untrusted computing environment 104 that includes one or more other computing devices, data storage devices, network infrastructure components, and so forth. The components of the trusted computing environment 102 may have a first trust level, and the components of the untrusted computing environment 104 may have a second trust level that is different from the first trust level. The first trust level may be higher than the second trust level, such that the security measures to control access to the trusted computing environment 102 are more stringent than the security measures that control access to the untrusted computing environment 104.

In some cases, the trusted computing environment 102 may include one or more computing devices that communicate with one another over a network that is segregated or otherwise separate from a broader network that includes the untrusted computing environment 104. The computing devices within the trusted computing environment 102 may be accessible by authorized users through secured, locked, or guarded physical locations, or through secure network connections. In some cases, the authorized users may have undergone a background check or other security procedures to gain access to the trusted computing environment 102. Further, the computing, storage, and network infrastructure of the trusted computing environment 102 may be self-contained and at least partly isolated from computing devices and networks in the untrusted computing environment 104, to prevent sensitive information from leaking outside the trusted computing environment 102 without authorization. In some cases, users may also require some level of authorization to access the untrusted computing environment 104. A larger number of users may be authorized to access the untrusted computing environment 104 than are authorized to access the trusted computing environment 102.

Untokenized information 106 may be generated by processes or applications executing within the trusted computing environment 102. The untokenized information 106 may include files generated within the trusted computing environment 102. In some cases, the untokenized information 106 may include log files generated by applications or processes to track, audit, analyze, or debug the execution of such applications or processes. For example, applications written in the Java® programming language may employ the Java® logging framework, including the Java® Logging Application Programming Interface (API), to write to one or more log files during execution. Implementations also support other types of logging and other logging frameworks. The untokenized information 106 may also include data streams received over a network from applications or processes executing in the trusted computing environment 102. Such streams may include information that is received incrementally, such that processing or analysis of a portion of the stream may be performed during or prior to the receipt of subsequent portions. Implementations also support other types of untokenized information 106.

The untokenized information 106 may be received by one or more trusted server device(s) 108 that operate within the trusted computing environment 102. The trusted server device(s) 108 may be any type of computing device, including but not limited to desktop computer, a personal computer, a mainframe computer, a cloud computing device, a network computer, and so forth. An example of the trusted server device(s) 108 is described further with reference to FIG. 2. The trusted server device(s) 108 may execute a tokenization module 110 to perform operations for tokenizing the untokenized information 106, as described further below.

The trusted server device(s) 108 and the tokenization module 110 may communicate with a token mapping datastore 112 that operates within the trusted computing environment 102. The token mapping datastore 112 may include any number and any type of relational or non-relational datastore. As used herein, a relational datastore describes a datastore that employs a relational storage format including one or more formally described tables, each table including one or more columns associated with data attributes. A non-relational datastore may employ a non-relational data storage format that may not comply with a relational database model. For example, a non-relational datastore may include one or more hierarchical databases, network databases, key-value datastores, hash tables, flat files, associative arrays, other types of data structures, or unstructured data storage.

In implementations where the token mapping datastore 112 includes one or more relational datastores, such datastores may be managed through a relational database management system (RDBMS). The token mapping datastore 112 may include any number of relational databases, including but not limited to databases managed through any of the following: Oracle® and MySQL®, from Oracle Corporation® of Redwood City, Calif.; DB2®, from International Business Machines® (IBM) Corporation of Armonk, N.Y. ; Linter®, from the RELEX Group® of Voronezh, Russia; Microsoft Access® and Microsoft SQL Server®, from Microsoft Corporation® of Redmond, Wash.; PostgreSQL®, from the PostgreSQL Global Development Group; and SQLite®, from D. Richard Hipp.

In implementations where the token mapping datastore 112 includes one or more non-relational datastores, such datastores may include datastores managed through any of the following: FoxPro® database management system, from Microsoft Corporation® of Redmond, Wash.; ParAccel® Analytic Database, from ParAccel, Incorporated® of San Diego, Calif.; and Hadoop®, from the Apache Software Foundation®.

The token mapping datastore 112 may store token mapping data 114. The token mapping data 114 may provide an association between one or more strings or words to be replaced by tokens in the untokenized information 106. In some implementations, the association is a one-to-one mapping between strings and tokens, such that each unique string in the token mapping data 114 is associated with a unique token. Alternatively, the mapping may be one-to-many, or many-to-one. The token mapping data 114 may be a key-value system, in which each string is a key that corresponds to a value that is a token. Alternatively, the key-value system may employ the token as a key that corresponds to a value that is a string. The tokens may be of any size, length, or data type. In some implementations, the tokens are all of a same size or length that is large enough to provide unique tokens for all the unique strings present in the untokenized information 106.

On receiving untokenized information 106, the tokenization module 110 may analyze the untokenized information 106 to determine one or more strings included in the untokenized information 106. In some implementations, this analysis may include parsing the untokenized information 106, or a portion thereof, into one or more words that are separated by whitespace characters, such as spaces, tabs, new paragraphs, newlines, end-of-line characters, carriage returns, and so forth. For each string or word in the untokenized information 106, the tokenization module 110 may determine the corresponding token based on the token mapping data 114. For strings or words that do not have a mapping in the token mapping data 114, a new token may be generated and stored in the token mapping data 114. Determining a token to replace a string or word in the untokenized information 106 is described further with reference to FIG. 8.

The process of replacing strings or words with tokens is referred to herein as tokenization, and the process of replacing tokens with their corresponding strings is referred to herein as detokenization. In some implementations, every string or word in the untokenized information 106 is replaced with a token by the tokenization module 110, to generate tokenized information 116. Alternatively, a subset of the strings or words in the untokenized information 106 may be replaced with tokens to generate the tokenized information 116. The tokenized information 116 may be sent outside the trusted computing environment 102, to one or more untrusted server devices 118 operating in the untrusted computing environment 104. The untrusted server device(s) 118 are described further with reference to FIG. 3, and may include any type of computing device, such as those described above with regard to the trusted server device(s) 108.

The untrusted server device(s) 118 may execute a receiving module 120 that performs operations for receiving the tokenized information 116 and storing them in a tokenized information datastore 122 in the untrusted computing environment 104. The tokenized information datastore 122 may include any type of data storage system, such as those described above with reference to the token mapping datastore 112. For example, the token mapping datastore 112 may include a ranged key-value system, enabling a search to be performed based on any number of search terms and a date/time value range.

In some implementations, the untokenized information 106 may be tokenized in portions and each portion may be separately sent to the untrusted server device(s) 118, which then assembles the received portions into the tokenized information 116 for storage. For example, the untokenized information 106 may be divided into lines, and each line may be tokenized by the tokenization module 110 and sent to the untrusted server device(s) 118. The receiving module 120 may then assemble the tokenized lines into the tokenized information 116 for storage in the tokenized information datastore 122.

In some implementations, the receiving module 120 may also add a timestamp to the received tokenized information 116, or to the received portions of the tokenized information 116. The timestamp may indicate a date, a time, or a date and time when the tokenized information 116, or the portion of the tokenized information 116, was received at the receiving module 120. Such timestamps may facilitate searching for the tokenized information 116 stored in the tokenized information datastore 122. Operations of the untrusted server device(s) 118, and the receiving module 120, are described further with reference to FIG. 7.

Implementations also enable searching the tokenized information datastore 122 to retrieve one or more tokenized files or tokenized data streams included in the tokenized information 116 stored therein. The retrieved tokenized information 116 may be at least partly detokenized for presentation to a user. Accordingly, the untrusted server device(s) 118 may execute a search module 124 to enable users to search the tokenized information datastore 122. Operations of the search module 124 are described further with reference to FIG. 9.

The search module 124 may provide a user interface to enable a user to enter one or more search terms, and in some implementations a date/time range, to be used to search the tokenized information datastore 122. Users may interact with the search module 124 through one or more user devices 126. The user device(s) 126 may be any type of computing device, including but not limited to a smartphone, a tablet computer, a wearable computer, an implanted computer, a mobile gaming device, an electronic book reader, an automotive computer, a desktop computer, a personal computer, a laptop computer, a thin client, a terminal, a game console, a smart appliance, a home entertainment device, a mainframe computer, a server computer, a network computer, and so forth.

In some implementations, the untrusted computing environment 104 may include a whitelist token mapping datastore 128, which stores whitelist token mapping data 130. The whitelist token mapping datastore 128 may include any type of data storage system, such as those described above with reference to the token mapping datastore 112. In some cases, the whitelist token mapping data 130 may be a subset of the token mapping data 114 that includes token mappings for strings or words that are non-sensitive information. Accordingly, the whitelist token mapping data 130 may include key-value data associating one or more strings or words with one or more tokens, as described above with regard to the token mapping data 114.

In some implementations, the whitelist token mapping data 130 may include token mappings for strings or words that are known to be non-sensitive information, or that have a high probability of being non-sensitive information. In some implementations, the untrusted server device(s) 118 may include a whitelist update module 132, which performs operations to update the whitelist token mapping data 130. For example, the whitelist token mapping data 130 may include mapping data for strings that include hostnames of computing devices operating within the trusted computing environment 102, or usernames for users of such computing devices. The whitelist token mapping data 130 may also include common or standard logging message strings generated by applications that use a particular logging framework. For example, commonly occurring Java® logging strings may be included in the whitelist token mapping data 130. The whitelist update module 132 may communicate with the trusted server device(s) 108 to request tokens corresponding to hostnames, usernames, common or standing logging message strings, or other non-sensitive information. Operations for creating and updating the whitelist token mapping data 130 are described further with reference to FIG. 10.

On receiving the one or more search terms entered by a user into the search interface, the search module 124 may determine a token that corresponds to each of the entered search terms. The search module 124 may first query the whitelist token mapping datastore 128 to retrieve tokens for those search terms that are present in the whitelist token mapping data 130. For search terms that are not present in the whitelist token mapping data 130, the search module 124 may request the token mapping data 114 from the tokenization module 110. Having received tokens corresponding to each of the search term(s), the search module 124 may search the tokenized information datastore 122 for tokenized information 116 that includes the tokens corresponding to the search term(s). In some cases, the search may also be based on a date/time range specified by the user through the search user interface.

The tokenized information 116 resulting from the search may be at least partly detokenized by replacing those tokens in the tokenized information 116 that are present in the whitelist token mapping data 130. Thus, implementations may provide at least partly detokenized versions of the tokenized information 116 in response to a search request, where the at least partly detokenized information includes the original strings for non-sensitive information, but still includes the tokens in place of any sensitive information that was present in the original untokenized information 106.

In some implementations, the same whitelist token mapping data 130 may be available to all users requesting searches through the search module 124. Alternatively, different users may have access to different sets of the whitelist token mapping data 130. In such cases, an individual user or group of users may be associated with a particular set of access permissions that are stored as access control data in memory on the trusted server device(s) 108, the untrusted server device(s) 118, or both. The user may be authenticated to the search module 124 by entering credentials such as username, password, user group credentials, role, and so forth. On receiving a request for token mapping data 114 for search terms entered by the user into the search module 124, the trusted server device(s) 108 may check whether the user's access permissions permit access to the token(s) for the requested search term(s). If not, the request may be denied. If so, the request may be fulfilled, and the requested token mapping data 114 may be provided to the user, and subsequently added to the whitelist token mapping datastore 128. Because different users, or different groups of users, may be permitted access to different sets of the token mapping data 114, the whitelist token mapping datastore 128 may also control access to different sets of the whitelist token mapping data 130 based on users' access permissions. User-based or group-based access permissions are described further with reference to FIG. 11.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), and mobile communications networks (e.g. 3G, 4G, and so forth). In some implementations, communications between devices in the trusted computing environment 102 and devices in the untrusted computing environment 104 may be encrypted or otherwise secured. For example, such communications may employ one or more public or private cryptographic keys, digital certificates, or other credentials supported by a security protocol such as any version of the Secure Sockets Layer (SSL) or Transport Layer Security (TLS) protocol.

Figure 2:
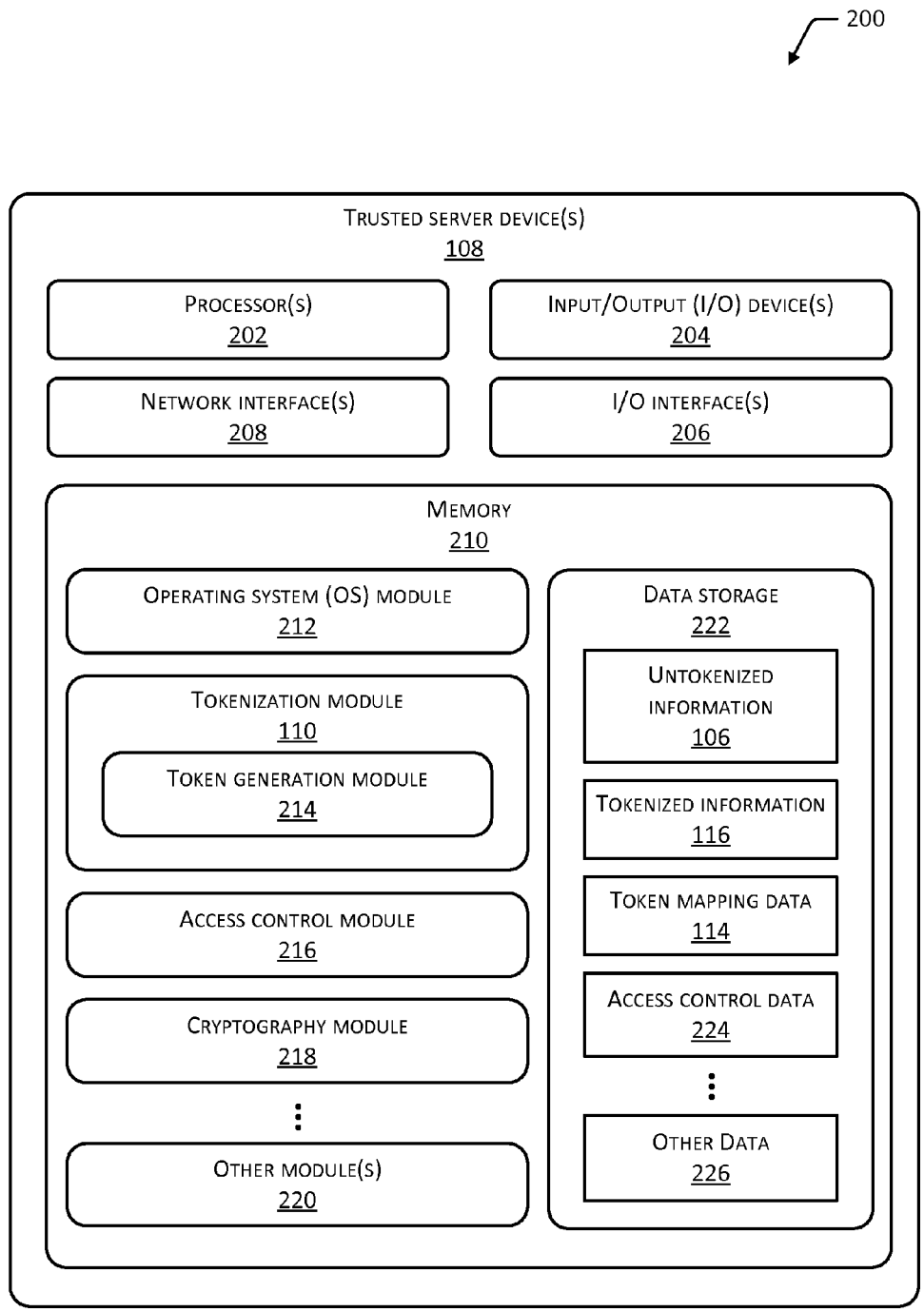
FIG. 2 depicts a block diagram of a trusted server device that may operate in the trusted computing environment and that may perform operations to tokenize information for storage in the untrusted computing environment.

FIG. 2 depicts a block diagram 200 of an example of the trusted server device(s) 108 that may operate in the trusted computing environment 102. As shown in the block diagram 200, the trusted server device(s) 108 may include one or more processors 202 configured to execute one or more stored instructions. The processor(s) 202 may comprise one or more cores.

The trusted server device(s) 108 may include one or more input/output (I/O) devices 204. The I/O device(s) 204 may include input devices such as a keyboard, a mouse, a pen, a game controller, a touch input device, an audio input device (e.g., a microphone), an image capture device (e.g., a camera), a gestural input device, a haptic input device, or other devices. In some cases, The I/O device(s) 204 may also include output devices such as a display, an audio output device (e.g., a speaker), a printer, a haptic output device, and so forth. The I/O device(s) 204 may be physically incorporated with the trusted server device(s) 108, or may be externally placed.

The trusted server device(s) 108 may include one or more I/O interfaces 206 to enable components or modules of the trusted server device(s) 108 to control, interface with, or otherwise communicate with the I/O device(s) 204. The I/O interface(s) 206 may enable information to be transferred in or out of the trusted server device(s) 108, or between components of the trusted server device(s) 108, through serial communication, parallel communication, or other types of communication. For example, the I/O interface(s) 206 may comply with a version of the RS-232 standard for serial ports, or with a version of the Institute of Electrical and Electronics Engineers (IEEE) 1284 standard for parallel ports. As another example, the I/O interface(s) 206 may be configured to provide a connection over Universal Serial Bus (USB) or Ethernet. In some cases, the I/O interface(s) 206 may be configured to provide a serial connection that is compliant with a version of the IEEE 1394 standard. The trusted server device(s) 108 may also include one or more busses or other internal communications hardware or software that allow for the transfer of data between the various modules and components of the trusted server device(s) 108.

The trusted server device(s) 108 may include one or more network interfaces 208 that enable communications between the trusted server device(s) 108 and other networked devices. The network interface(s) 208 may include one or more network interface controllers (NICs) or other types of transceiver devices configured to send and receive communications over a network.

The trusted server device(s) 108 may include one or more memories, described herein as memory 210. The memory 210 comprises one or more computer-readable storage media (CRSM). The CRSM may include one or more of an electronic storage medium, a magnetic storage medium, an optical storage medium, a quantum storage medium, a mechanical computer storage medium, and so forth. The memory 210 provides storage of computer-readable instructions, data structures, program modules, and other data for the operation of the trusted server device(s) 108.

The memory 210 may include an operating system (OS) module 212. The OS module 212 is configured to manage hardware resources such as the I/O device(s) 204, the I/O interface(s) 206, and the network interface(s) 208, and to provide various services to applications, processes, or modules executing on the processor(s) 202. The OS module 212 may include one or more of the following: any version of the Linux® operating system originally released by Linus Torvalds; any version of iOS® from Apple Corp.® of Cupertino, Calif., USA; any version of Windows® or Windows Mobile® from Microsoft Corp.® of Redmond, Wash., USA; any version of Android® from Google Corp.® of Mountain View, Calif., USA and its derivatives from various sources; any version of Palm OS® from Palm Computing, Inc.® of Sunnyvale, Calif., USA and its derivatives from various sources; any version of BlackBerry OS® from Research In Motion Ltd.® of Waterloo, Ontario, Canada; any version of VxWorks® from Wind River Systems® of Alameda, Calif., USA; or other operating systems.

Figure 6:
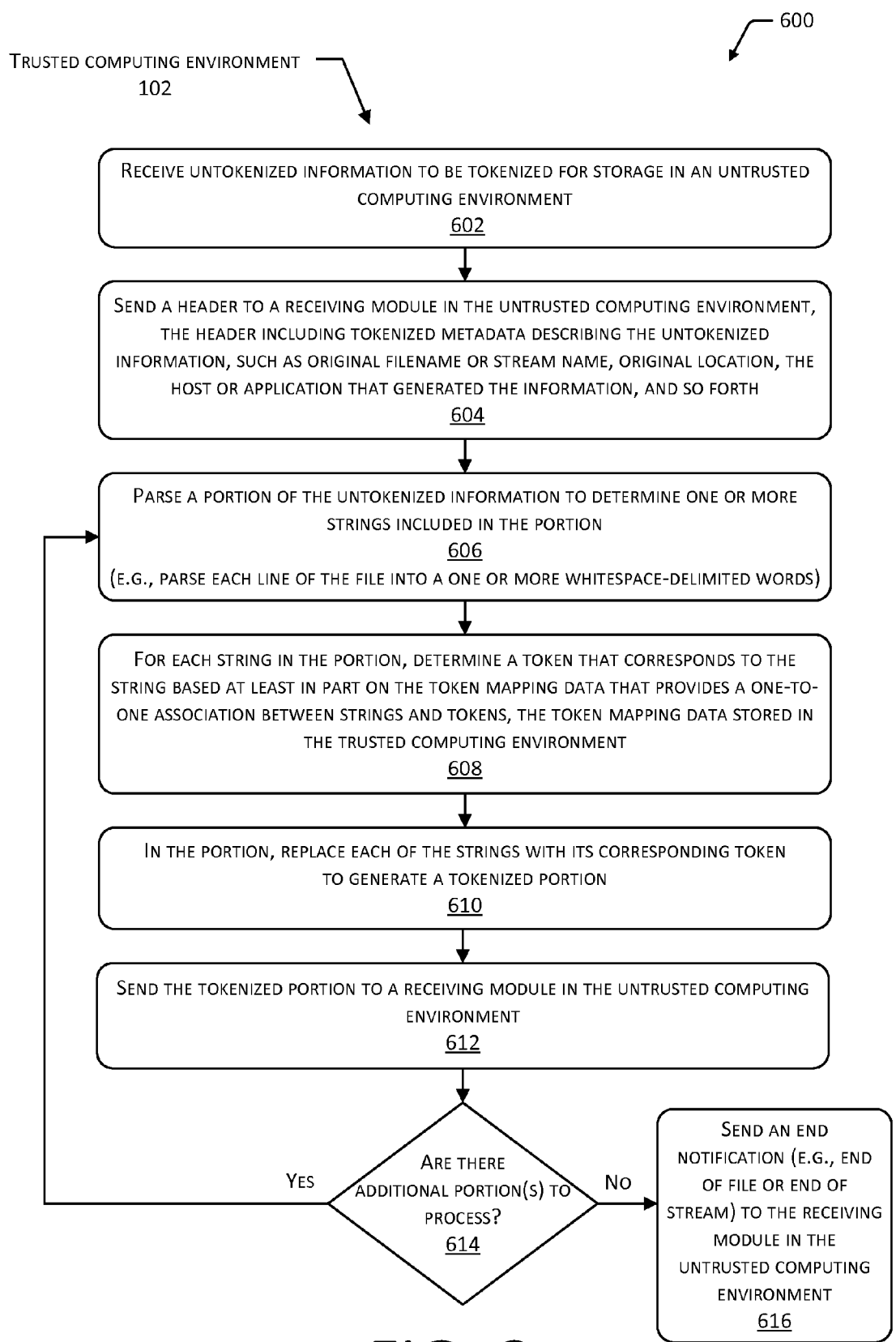
FIG. 6 depicts a flow diagram of a process for generating tokenized information to be stored in the untrusted computing environment.
Figure 8:
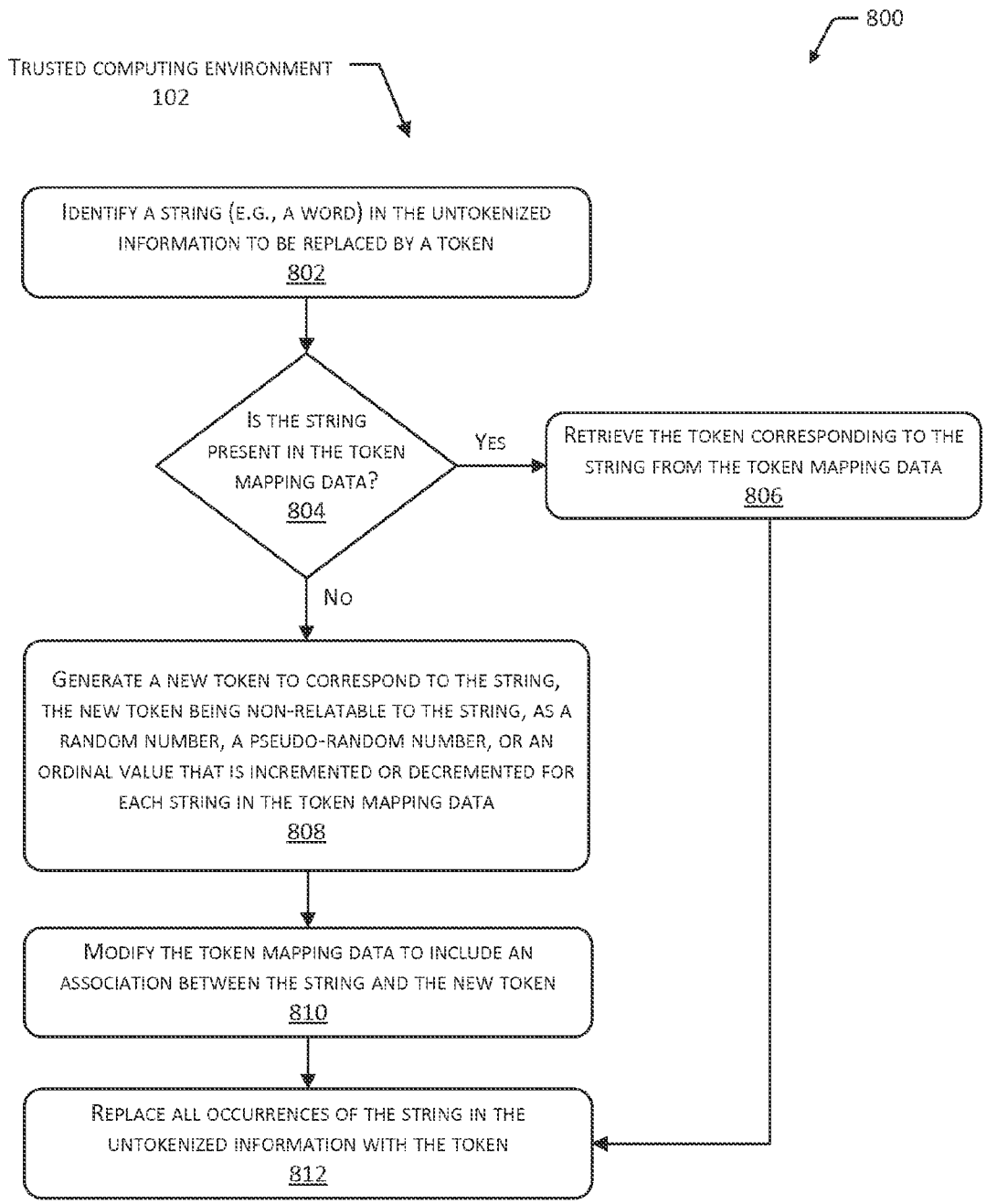
FIG. 8 depicts a flow diagram of a process for replacing one or more strings in untokenized information with one or more tokens, during the tokenization process.

In some implementations, the memory 210 includes the tokenization module 110, described further with reference to FIGS. 6 and 8. The tokenization module 110 may include a token generation module 214, which performs operations for generating a new token corresponding to a string or word that is not present in the token mapping data 114. Such operations are described further with reference to FIG. 8.

The memory 210 may include an access control module 216, which may control access by users or processes to the trusted server device 108, the token mapping datastore 112, or other computing devices operating in the trusted computing environment 102. In some cases, the access control module 216 may act as a gatekeeper that allows information in the trusted computing environment 102 to be accessed from the untrusted computing environment 104 by authorized users and processes, and may not allow access by unauthorized users or processes. The memory 210 may also include a cryptography module 218, which may operate to encrypt, decrypt, or otherwise secure information that is sent between computing devices within the trusted computing environment 102, or that is sent between the trusted computing environment 102 and the untrusted computing environment 104. The memory 210 may also include one or more other modules 220.

The memory 210 may include data storage 222 to store information for operations of the trusted server device(s) 108. The data storage 222 may comprise a database, array, structured list, tree, or other data structure, and may be a relational or a non-relational datastore. The data storage 222 may store the untokenized information 106, or at least a portion thereof. The data storage 222 may store the tokenized information 116, or at least a portion thereof. In some implementations, the data storage 222 may store the token mapping data 114. Alternatively, the token mapping data 114 may be stored in the token mapping datastore 112 that is external to the trusted server device(s) 108, as shown in FIG. 1.

The memory 210 may also include access control data 224, which may be employed by the access control module 216, the cryptography module 218, or other components of the trusted server device(s) 108. In some cases, the access control data 224 may include credentials, identification information, or other types of authentication information that may be employed to determine whether a user or a process is to be allowed access to information in the trusted computing environment 102. For example, such information may include user account information such as usernames, passwords, group affiliations, or access permissions, as well as digital security certificates, cryptographic keys, and other information to authenticate users requesting access. The access control data 224 may also include communications protocol information describing those processes or applications which may be allowed to access information in the trusted computing environment 102.

The data storage 222 may also store other data 226. In some implementations, at least a portion of the information stored in the data storage 222 may be stored externally to the trusted server device(s) 108, on other devices that are accessible to the trusted server device(s) 108 via the I/O interface(s) 206 or via the network interface(s) 208.

Figure 3:
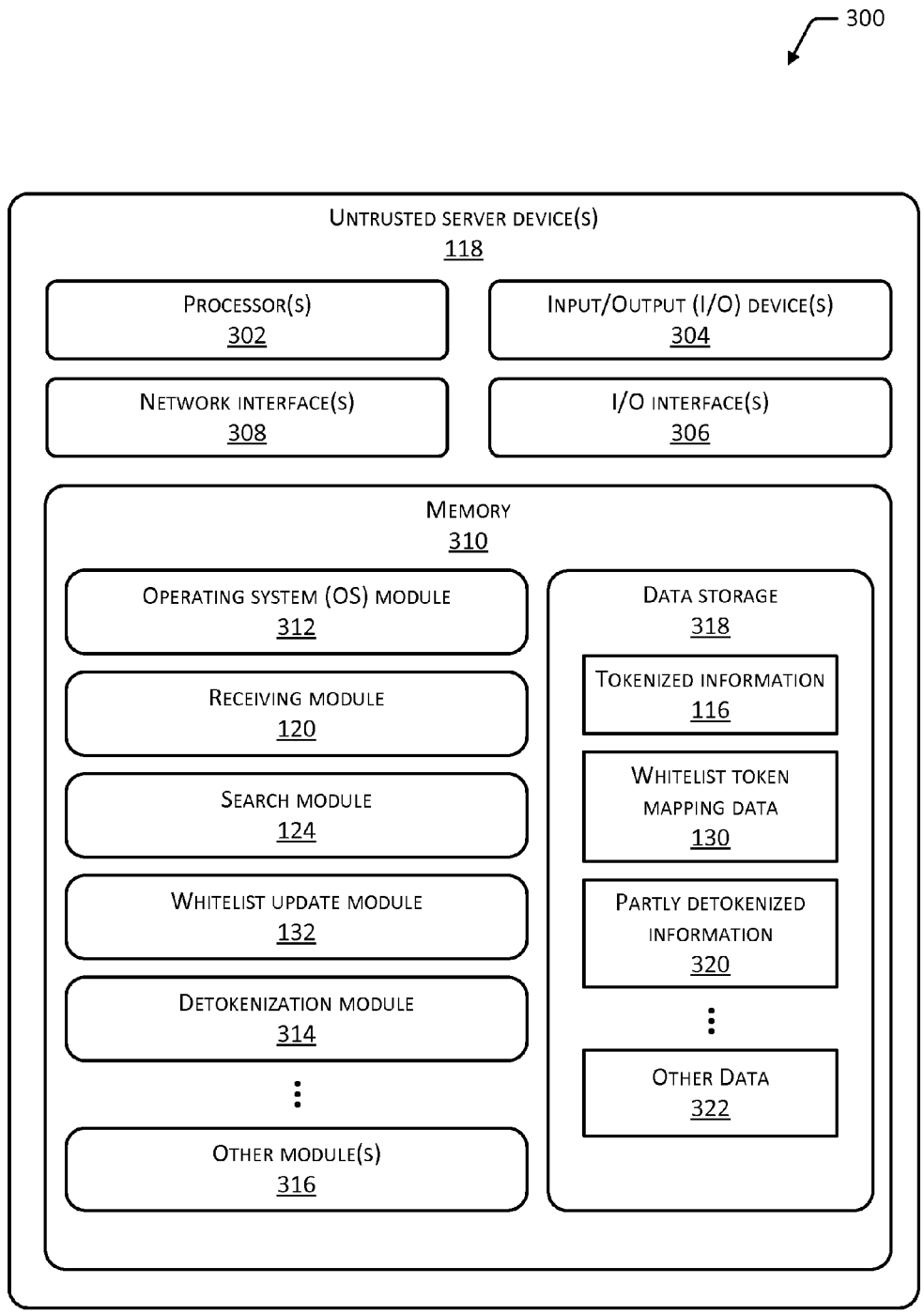
FIG. 3 depicts a block diagram of an untrusted server device that may operate in the untrusted computing environment, and may perform operations to receive and store tokenized information as well as to search a tokenized information datastore.

FIG. 3 depicts a block diagram 300 of an example of the untrusted server device(s) 118 that may operate in the untrusted computing environment 104. As shown in the block diagram 300, the untrusted server device(s) 118 may include one or more processors 302 configured to execute one or more stored instructions. The processor(s) 302 may comprise one or more cores.

The untrusted server device(s) 118 may include one or more I/O devices 304, one or more I/O interfaces 306, and one or more network interfaces 308, such as those described above with regard to the I/O device(s) 204, the I/O interface(s) 206, and the network interface(s) 208 respectively. The I/O device(s) 304 may be physically incorporated with the untrusted server device(s) 118, or may be externally placed.

The untrusted server device(s) 118 may include one or more memories, described herein as memory 310. The memory 310 comprises one or more CRSM. The CRSM may include one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the untrusted server device(s) 118.

The memory 310 may include an OS module 312. The OS module 312 is configured to manage hardware resources such as the I/O device(s) 304, the I/O interface(s) 306, and the network interface(s) 308, and to provide various services to applications, processes, or modules executing on the processor(s) 302. The OS module 312 may include one or more of the operating systems listed above with regard to the OS module 212.

Figure 7:
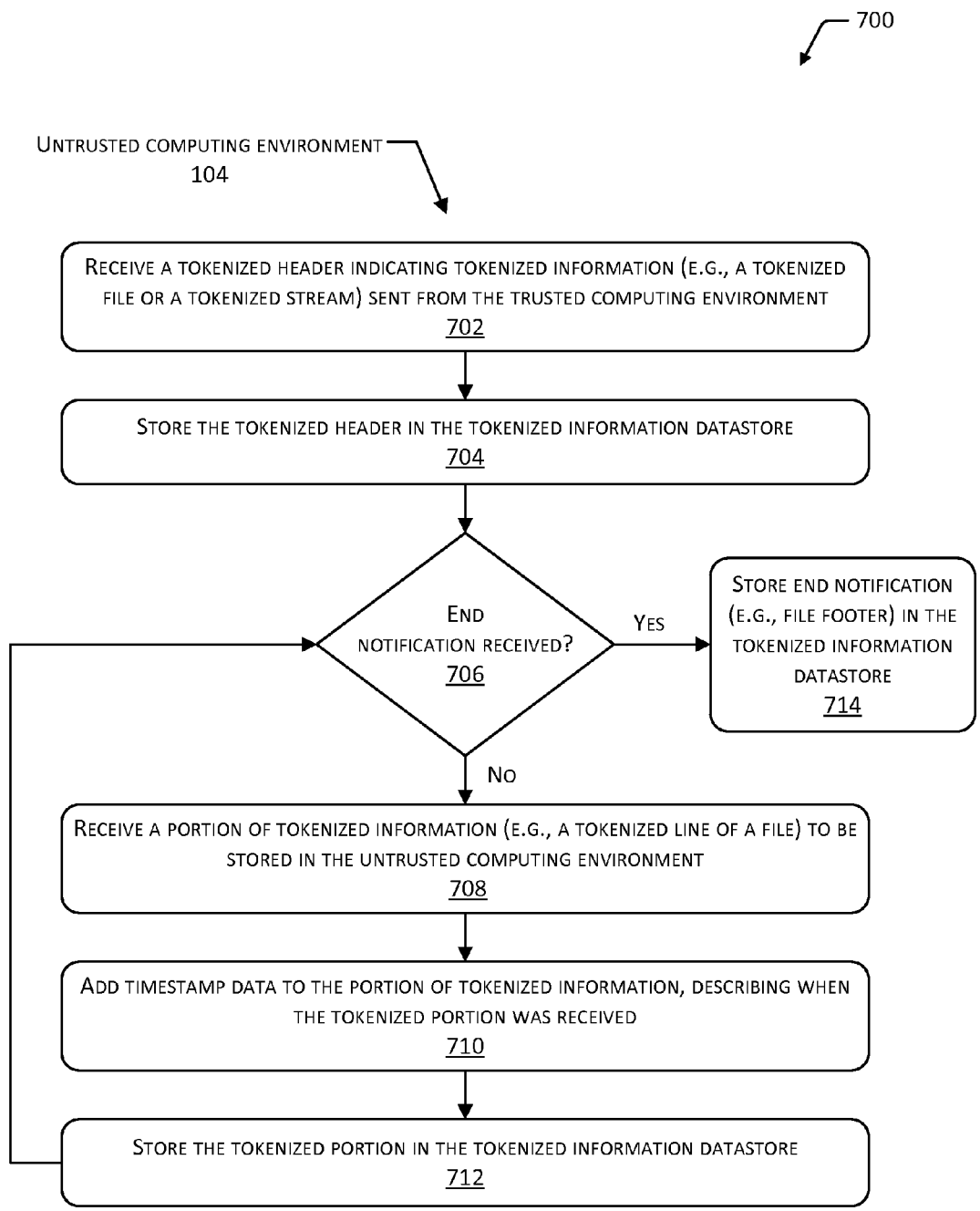
FIG. 7 depicts a flow diagram of a process for receiving one or more portions of tokenized information, and storing the portions in the untrusted computing environment.
Figure 9:
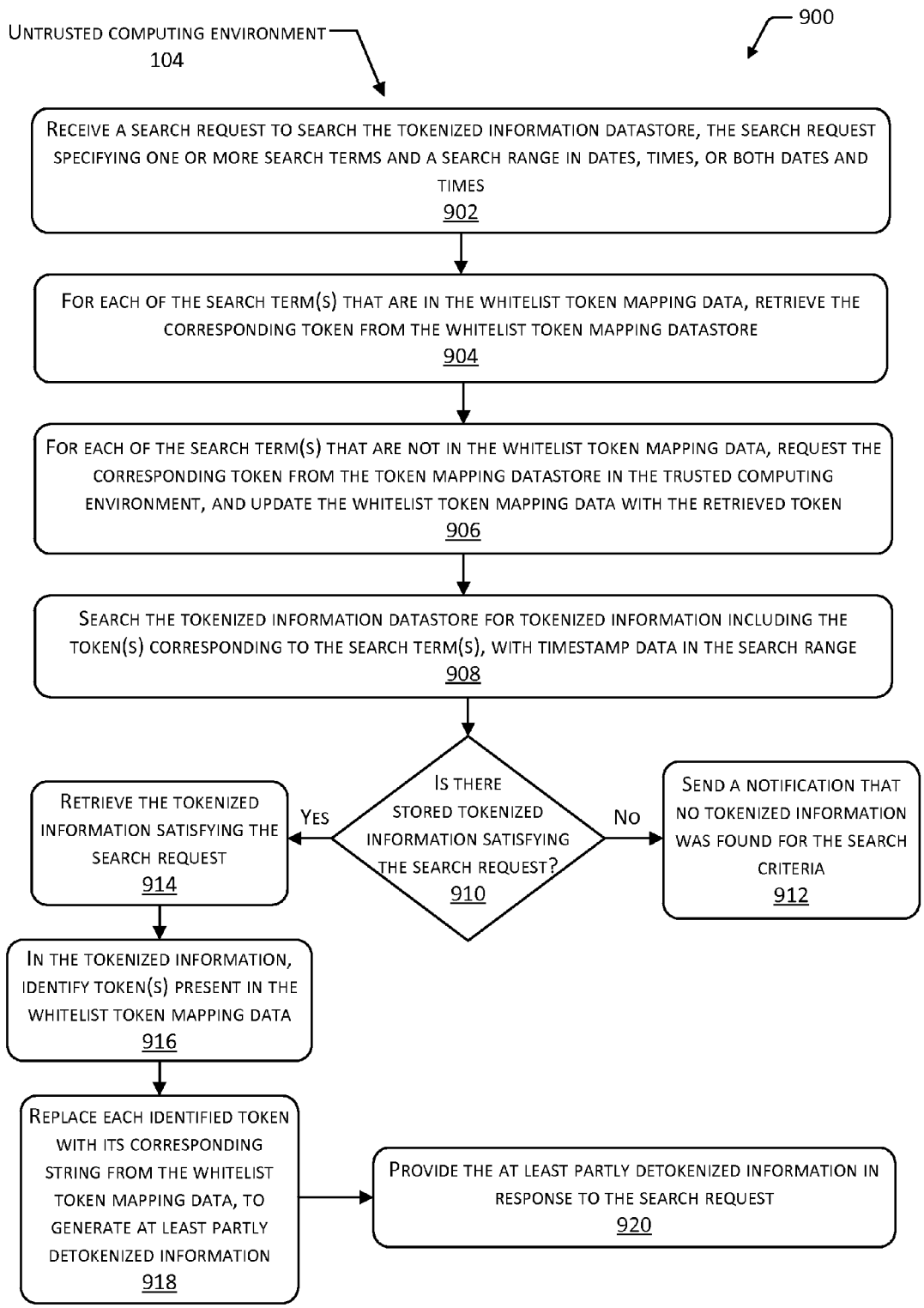
FIG. 9 depicts a flow diagram of a process for searching for tokenized information in the tokenized information datastore, and providing partly detokenized information as a search result.

In some implementations, the memory 310 includes the receiving module 120 and the search module 124, described further with reference to FIGS. 7 and 9 respectively. The memory 310 may also include the whitelist update module 132 that performs operations to create, update, or otherwise populate the whitelist token mapping data 130. Operations of the whitelist update module 132 are described further with reference to FIG. 10. The memory 310 may also include a detokenization module 314, which performs operations for at least partly detokenizing the tokenized information 116 that is retrieved based on searches of the tokenized information datastore 122, as described further with reference to FIG. 9. The memory 310 may also include one or more other modules 316, such as a user authentication module or a security module to control access to the untrusted server device(s) 118.

The memory 310 may include data storage 318 to store information for operations of the untrusted server device(s) 118. The data storage 318 may comprise a database, array, structured list, tree, or other data structure, and may be a relational or a non-relational datastore. The data storage 318 may store the tokenized information 116, or at least a portion thereof. In some implementations, the data storage 318 may store the whitelist token mapping data 130. Alternatively, the whitelist token mapping data 130 may be stored in the whitelist token mapping datastore 128 that is external to the untrusted server device(s) 118, as shown in FIG. 1.

In some implementations, the memory 310 stores at least partly detokenized information 320 that may be provided to a user as search results. The partly detokenized information 320 may be generated by replacing, in the tokenized information 116, one or more tokens that are present in the whitelist token mapping data 130, as described with regard to FIG. 9. The data storage 318 may also store other data 322, such as user authentication information, security credential information, and so forth. In some implementations, at least a portion of the information stored in the data storage 318 may be stored externally to the untrusted server device(s) 118, on other devices that are accessible to the untrusted server device(s) 118 via the I/O interface(s) 306 or via the network interface(s) 308.

Figure 4:
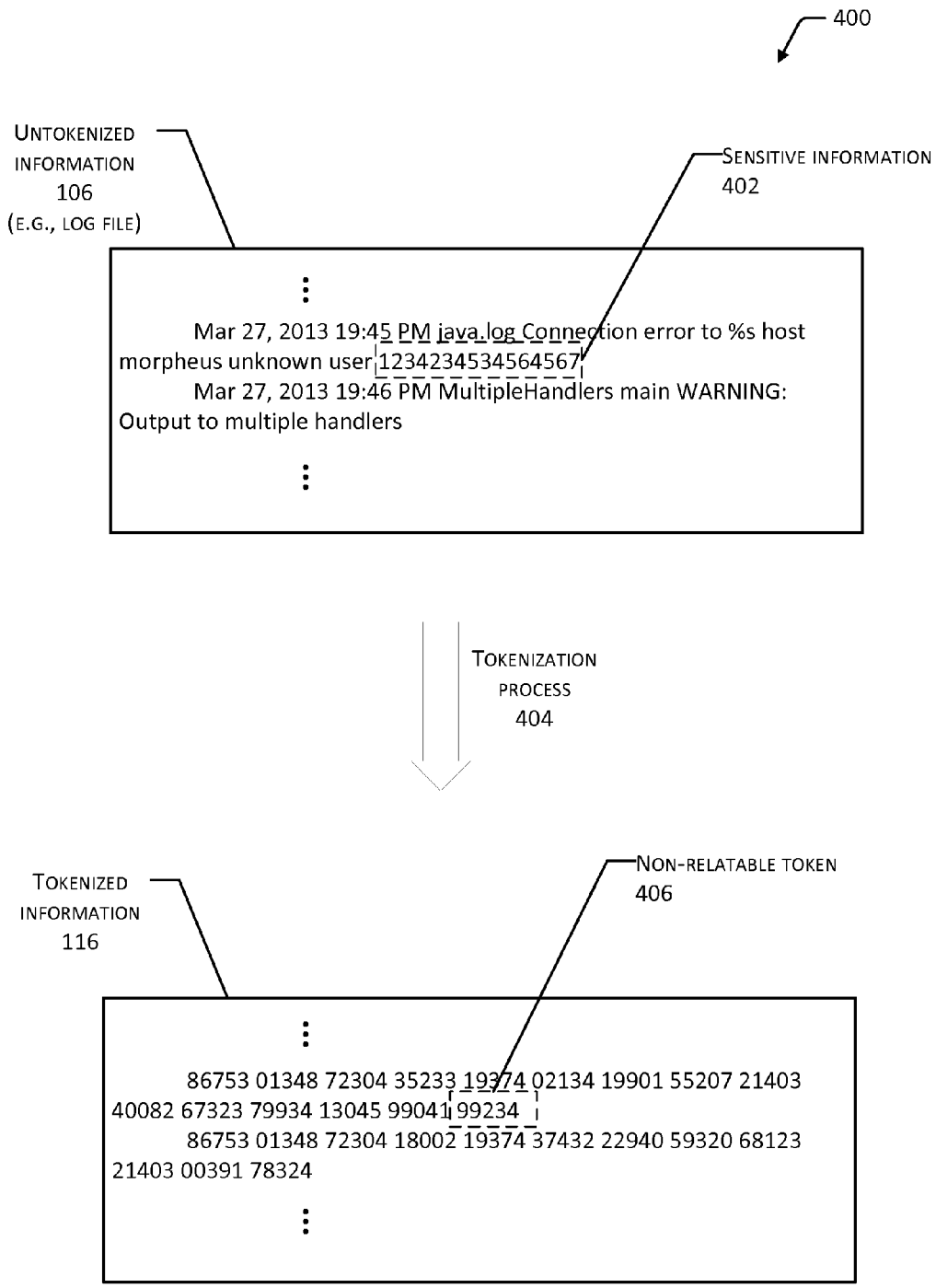
FIG. 4 depicts an example of untokenized information that may include sensitive information, and tokenized information that is generated based on tokenizing the untokenized information.

FIG. 4 depicts a schematic 400 showing an example of untokenized information 106 that may include sensitive information 402, and tokenized information 116 that is generated through a tokenization process 404. In this example, the untokenized information 106 is a log file that may be generated by an application that employs the Java® logging framework, or another logging framework. Although a portion of the log file is shown including two lines, the untokenized information 106 may be of any length, size, or format. In this example, the first line includes a string that may comprise sensitive information 402, in this case a 16-digit number that may correspond to a credit card number. In some cases, one or more words or strings of the untokenized information 106 may be numbers that satisfy the Luhn, or mod 10, algorithm that may be employed to validate identification numbers such as credit card numbers. Such sensitive information 402 may have been inappropriately written to the untokenized information 106 by a process executing within the trusted computing environment 102.

The tokenization process 404 may be performed by the tokenization module 110, to replace one or more strings in the untokenized information 106 with one or more tokens. In some implementations, one or more lines of the untokenized information 106 may be parsed into words based on whitespace characters separating the words in the untokenized information 106. Each of the words may then be replaced with a token that corresponds to the word, according to the token mapping data 114. In some implementations, the replacement of each word with a token may be performed by writing the token over the word in the untokenized information 106, such that the untokenized information 106 is replaced with the tokenized information 116. Alternatively, the tokenized information 116 may be created as a separate file, and the original, untokenized information 106 may be stored in a secure datastore in the trusted computing environment 102.

Figure 5:
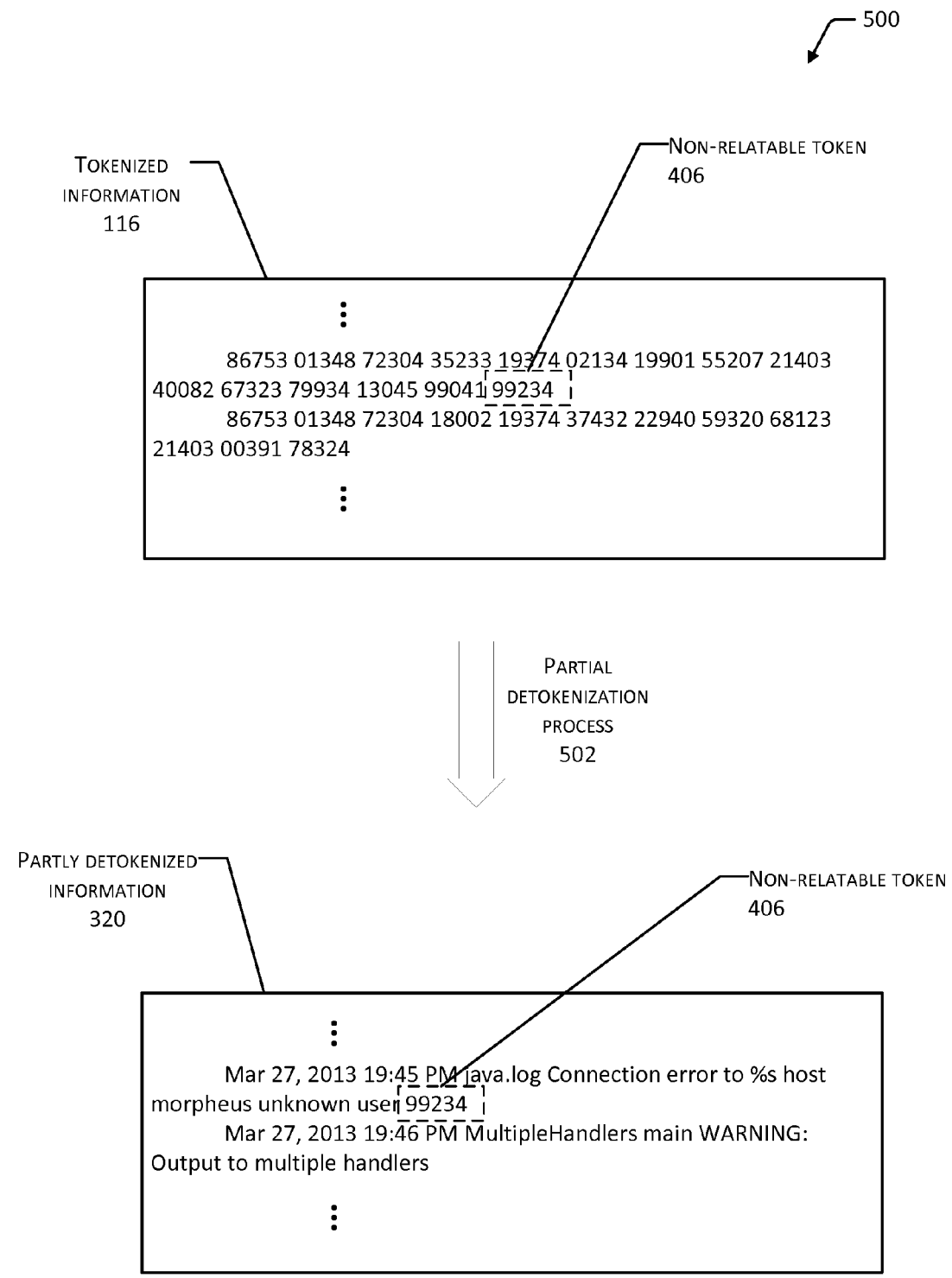
FIG. 5 depicts an example of tokenized information, and partly detokenized information that may be provided as a search result in the untrusted computing environment.

In the example shown in FIG. 4, each of the words of the untokenized information 106 including the sensitive information 402 have been replaced with a token, to generate the tokenized information 116. In some implementations, the tokens include one or more non-relatable tokens 406. As used herein, a non-relatable token describes a token that replaces a string such that the original string may not be derived based on knowledge of the token without accessing the token mapping data 114 that associates strings with tokens. In some cases, the non-relatable token 406 may be determined based on a random or pseudo-random number generation algorithm, where the seed employed by the algorithm is not derived from or based on the string to be replaced. Alternatively, the non-relatable token 406 may be an ordinal value such as a counter that is incremented or decremented for each unique word to be replaced in the untokenized information 106. Implementations support any method for determining the non-relatable token 406, such that the replaced string may not be derived based on knowledge of the token without accessing the token mapping data 114. Although the examples in FIGS. 4 and 5 show non-relatable tokens 406 as five digit numbers, implementations are not so limited. Implementations may employ non-relatable tokens 406 of any size, length, or data type.

FIG. 5 depicts a schematic 500 showing an example of the tokenized information 116, and the partly detokenized information 320 that may be provided as a search result in the untrusted computing environment 104. In the example shown, tokenized information 116 has been generated based on the untokenized information 106, and includes one or more non-relatable tokens 406 in place of the one or more strings or words in the untokenized information 106. Through a partial detokenization process 502, a subset of the tokens in the tokenized information 116 may be replaced with the corresponding strings from the original untokenized information 106, to generate the partly detokenized information 320. In some implementations, the subset of tokens replaced may include those tokens that are present in the whitelist token mapping data 130. Because the whitelist token mapping data 130 may include mapping information for strings that are non-sensitive information, the partial detokenization process 502 may generate partly detokenized information that includes the original non-sensitive strings from the untokenized information 106, but that still includes the non-relatable token(s) 406 in place of the original sensitive strings. In this way, implementations may provide for a redacted version of the untokenized information 106 to be presented outside the trusted computing environment 102, while maintaining the secrecy of the sensitive information.

FIG. 6 depicts a flow diagram 600 of a process for generating the tokenized information 116 to be stored in the untrusted computing environment 104. The operations of this process may be performed in the trusted computing environment 102, by the tokenization module 110 or another module of the trusted server device(s) 108.

At 602, the untokenized information 106 is received to be tokenized for storage in the untrusted computing environment 104. As described above, the received untokenized information 106 may be a log file, a log data stream, or another type of information generated by a process executing within the trusted computing environment 102.

In some implementations, the tokenization module 110 may generate a header for the tokenized information 116 to be sent to the untrusted computing environment 104. The header may include metadata describing the original file or data stream in the untokenized information 106. For example, the metadata may include the original filename or data stream name. The metadata may also include an original location of the file or data stream such as a hostname and file path where the original file was stored. The metadata may also include an identification of the host computer that generated the original file or data stream, or an identification of a particular process or application that generated the original file or data stream. The words or strings of the metadata may be tokenized as described herein, and at 604 a tokenized version of the header may be sent to the receiving module 120 of the untrusted server device(s) 118.

At 606, at least a portion of the untokenized information 106 is parsed to determine one or more strings included in the portion. In some implementations, the entire untokenized information 106 may be parsed at 606 to identify the strings included in the untokenized information 106. Alternatively, the untokenized information 106 may be parsed one portion at a time. For example, each line of the untokenized information 106 may be parsed and tokenized separately. In cases where the untokenized information 106 includes a data stream, portions of the data stream may be parsed and tokenized as they are received by the tokenization module 110. The portions of the untokenized information 106 may be of a same size or length, or may be of different lengths. In some cases, the portions of the untokenized information 106 may be divided by predetermined characters. For example, in implementations where the untokenized information 106 is tokenized line by line, the lines of the untokenized information 106 may be separated by one or more newline or carriage return characters. In some implementations, the parsing of each portion of the untokenized information 106 may identify one or more words that are separated by whitespace characters such as spaces, tabs, new paragraph characters, newline characters, carriage return characters, and so forth. Implementations also support other parsing methods to identify one or more strings included in at least a portion of the untokenized information 106.

At 608, for each string in the portion of the untokenized information 106 currently being processed, a token is determined that corresponds to the string. This determination may be based on the token mapping data 114. In some cases, the token mapping data 114 may provide a one-to-one mapping between strings and tokens. In such cases, each occurrence of a string in the untokenized information 106, or across multiple files or data streams in the untokenized information 106, may correspond to and be replaced with the same token. Determination of a token corresponding to a string is described further with reference to FIG. 8.

At 610, each of the strings in the portion is replaced by its corresponding token, to generate a tokenized version of the portion. At 612, the tokenized version of the portion is sent into the untrusted computing environment 104, to the receiving module 120 of the untrusted server device(s) 118.

At 614, a determination is made whether there are additional portions (e.g., additional lines) of the untokenized information 106 to be processed. If so, the process may return to 606 and tokenize the next portion of the untokenized information 106. If not, the process may proceed to 616. In some implementations, at 616 an end notification or message, indicating an end of file or end of stream, may be sent to the receiving module 120 of the untrusted server device(s) 118, indicating that all portions of the untokenized information 106 have been tokenized and sent.

FIG. 7 depicts a flow diagram 700 of a process for receiving one or more portions of the tokenized information 116, and storing the tokenized information 116 in the untrusted computing environment 104. The operations of this process may be performed in the untrusted computing environment 104, by the receiving module 120 or another module of the untrusted server device(s) 118.

At 702, a tokenized header may be received such as that generated at 604, indicating that tokenized information 116 is being sent from the trusted computing environment 102. At 704, the tokenized header may be stored in the tokenized information datastore 122.

At 706, the process may determine whether an end notification has been received, such as the end notification sent at 616. If not, the process may proceed to 708.

At 708, a portion of the tokenized information 116 is received to be stored in the untrusted computing environment 104. Such tokenized portions may be generated and sent as described with regard to FIG. 6.

At 710, in some implementations timestamp data may be added to one or more of the received tokenized portions. Such timestamp data may include a date, a time, or both a date and a time when the portion(s) were received. In some implementations, the timestamp data may indicate a date and time when the portion was created, and may be added to the tokenized portion(s) by the tokenization module 110 prior to sending the tokenized portions to the untrusted computing environment 104.

At 712, the tokenized portion may be stored in the tokenized information datastore 122. The process may then return to 706, and determine whether an additional tokenized portion has been received, or an end notification has been received. If it is determined at 706 that an end notification has been received, indicating that no further tokenized portions are being sent for this particular tokenized file or tokenized data stream, the process may proceed to 714. At 714, the end notification may be stored in the tokenized information datastore 122. Alternatively, the process may exit, or continue monitoring for additional tokenized files or data streams being sent as the tokenized information 116.

In some implementations, the process may assemble one or more received tokenized portions into blocks, and store each block in the tokenized information datastore 122. Alternatively, each received tokenized portion may be written to the tokenized information datastore 122 individually, as described in the example of FIG. 7. Moreover, in some cases, the process may receive all the tokenized portions for a particular file or data stream, and assemble the portions into a tokenized version of the file or data stream before storing the tokenized version in the tokenized information datastore 122.

FIG. 8 depicts a flow diagram 800 of a process for replacing one or more strings in the untokenized information 106 with one or more tokens, during the tokenization process described in FIG. 6. The operations of this process may be performed in the trusted computing environment 102, by the tokenization module 110, the token generation module 214, or another module of the trusted server device(s) 108.

At 802, a string in the untokenized information 106 is identified to be replaced by a token during the tokenization process. As described above, the string may be identified during a parsing of at least a portion of the untokenized information 106.

At 804, a determination is made whether a mapping of the string to a token is present in the token mapping data 114. If so, then at 806, the token corresponding to the string is retrieved from the token mapping data 114. If not, the process proceeds to 808. At 806, in some implementations, the corresponding token may be cached in memory 210 on the trusted server device(s) 108 to be used during subsequent tokenization.

At 808, a new token is generated to correspond to the string. As described above, the new token may be generated in a manner such that the new token is non-relatable to the string, such that the string may not be derived based on knowledge of the token without having access to the token mapping data 114. The token may exhibit no pre-existing relationship to or dependency on the string or word which it is to replace, and the original string or word may not be derived from the token without accessing the token mapping data 114. In some implementations, the token may be generated using a random or pseudo-random number generation algorithm, based on a seed that is not related to the string. Alternatively, the token may be an ordinal value such as a counter that is incremented or decremented for each string in the token mapping data 114. At 810, the token mapping data 114 may be updated or otherwise modified to include an association between the string and the new token.

At 812, all occurrences of the string in the untokenized information 106, or in a portion of the untokenized information 106 being processed, may be replaced with the token that was generated at 808 or retrieved at 806.

FIG. 9 depicts a flow diagram 900 of a process for searching the tokenized information datastore 122, and providing partly detokenized information 320 as a search result. The operations of this process may be performed in the untrusted computing environment 104, by the search module 124, the whitelist update module 132, the detokenization module 314, or another module of the untrusted server device(s) 118.

At 902, a search request may be received requesting a search for particular files or streams stored as the tokenized information 116. In some implementations, the search request may be received through a search user interface provided by the search module 124. The search request may specify one or more search terms. In some implementations, the search request may also specify a search range indicating a time period as a range of dates, times, or dates and times. The search range may be doubly bounded and specified as a time period from date/time X to date/time Y. Alternatively, the search range may include one bound, specified as a time period prior to date/time Z or a time period later than date/time Q.

At 904, for each of the search terms that are present in the whitelist token mapping data 130, the corresponding token is retrieved from the whitelist token mapping datastore 128. In some cases, the corresponding token(s) may have been stored in a cache in local memory, following a recent retrieval of the corresponding token(s) from the whitelist token mapping datastore 128. In such cases, the token(s) may be retrieved from the cache instead of from the whitelist token mapping datastore 128.

At 906, for each of the search terms that are not present in the whitelist token mapping data 130, the corresponding token is retrieved from the token mapping datastore 112 in the trusted computing environment 102. In some implementations, retrieving the corresponding token(s) from the token mapping datastore 112 may include sending a request for the corresponding token(s) to the tokenization module 110 or another software module executing in the trusted computing environment 102. The tokenization module 110 or another module may respond to the request by retrieving the corresponding token(s) from the token mapping datastore 112 and sending the corresponding token(s) to the search module 124. In some implementations, the token(s) retrieved from the token mapping datastore 112 may also be added to the whitelist token mapping data 130, to enable subsequent searches based on such search terms to proceed more efficiently. In some cases, the corresponding token(s) may have been stored in a cache in local memory, following a recent retrieval of the corresponding token(s) from the token mapping datastore 112. In such cases, the token(s) may be retrieved from the cache instead of requesting that they be retrieved from the token mapping datastore 112.

In some implementations, one or more security controls may operate on the trusted server device(s) 108, or in the tokenization module 110, to ensure that sensitive information is not sent outside the trusted computing environment 102. Examples of such security controls are described further with reference to FIG. 11.

At 908, the tokenized information datastore 122 is searched for tokenized information 116 that includes the token(s) retrieved at 904 and 906, and that have a timestamp within the search range specified in the search request. In some cases, the search module 124 may accept multiple search terms that are combined into a Boolean query, using logical operators such as AND, OR, XOR, NOT, and so forth. In such cases, the search at 908 may be based on the Boolean query specified in the search request.

At 910, a determination is made whether any tokenized information 116 was found to match the search terms and search range specified in the search request. If not, at 912 a notification may be sent indicating that no tokenized information 116 was found to satisfy the specified search criteria. Such a notification may be displayed as a message in the user interface provided by the search module 124, or in a communication such as an email, a text message, and the like. If the search identified tokenized information 116 that satisfied the search request, the process may proceed to 914.

At 914, the tokenized information 116 satisfying the search request may be retrieved from the tokenized information datastore 122. At 916, an identification is made of the tokens that are included in the retrieved tokenized information 116 for which a mapping is present in the whitelist token mapping data 130. At 918, each identified token is replaced with the corresponding string from the whitelist token mapping data 130, to generate the at least partly detokenized information 320. In cases where all the tokens in the tokenized information 116 are found in the whitelist token mapping data 130, the tokenized information 116 may be fully detokenized at 918 to restore the original untokenized information 106. In cases where a subset of the tokens in the tokenized information 116 is found in the whitelist token mapping data 130, the tokenized information 116 may be partly detokenized to generate the partly detokenized information 320 in which sensitive information that was present in the original untokenized information 106 remains substituted by a token.

At 920, the fully or partly detokenized information may be provided to the user in response to the search request.

Figure 10:
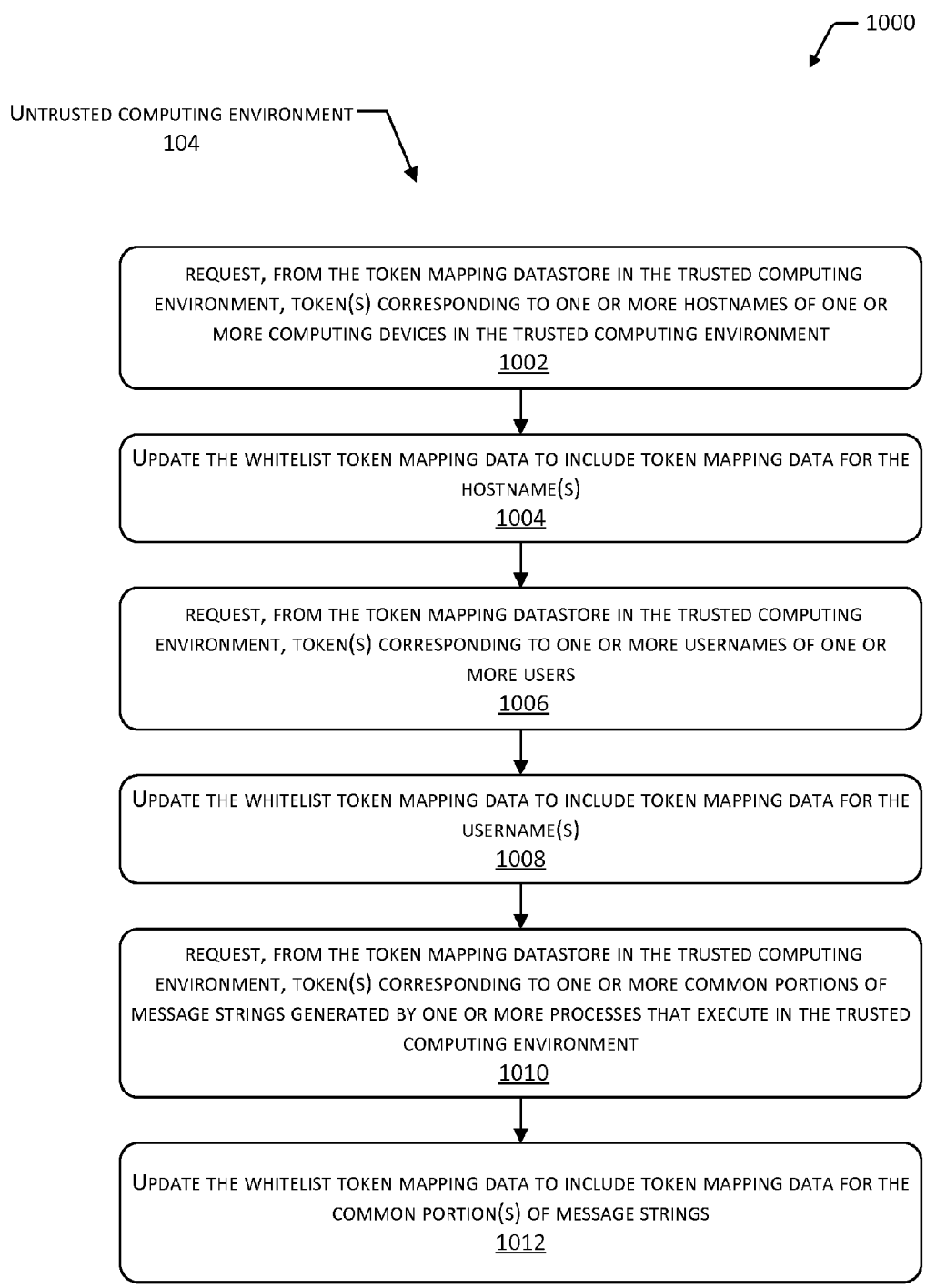
FIG. 10 depicts a flow diagram of a process for creating or updating whitelist token mapping data.

FIG. 10 depicts a flow diagram 1000 of a process for creating or updating whitelist token mapping data 130 to facilitate a search of the tokenized information datastore 122. The operations of this process may be performed in the untrusted computing environment 104, by the whitelist update module 132 or another module of the untrusted server device(s) 118.

As described above with reference to FIG. 9, the tokenized information 116 resulting from a search may be detokenized based on information in the whitelist token mapping data 130. Accordingly, to maximize the amount of information available to users in the untrusted computing environment 104, implementations may attempt to maximize the number of non-sensitive strings or words present in the whitelist token mapping data 130. The process of FIG. 10 may determine strings or words that are known or expected to be non-sensitive, and add token mappings for such non-sensitive strings or words into the whitelist token mapping data 130.

At 1002, a request may be made for token(s) corresponding to hostnames, addresses, or other information identifying one or more computing devices in the trusted computing environment 102. Such a request may be made to the trusted server device(s) 108, and may request that the token(s) corresponding to the hostnames or other identifying information be retrieved from the token mapping datastore 112. At 1004, the whitelist token mapping data 130 may be updated to include the token mappings for the hostnames or other identifying information.

At 1006, a request may be made for token(s) corresponding to usernames of one or more users. Such a request may be made to the trusted server device(s) 108, and may request that the token(s) corresponding to the hostnames or other identifying information be retrieved from the token mapping datastore 112. The users may include users of computing devices that operate in the trusted computing environment 102. At 1008, the whitelist token mapping data 130 may be updated to include token mappings for the usernames. Because non-sensitive hostnames and usernames may frequently occur in log files, log data streams, or in other types of untokenized information 106 created in the trusted computing environment 102, adding token mapping data for the hostnames and usernames into the whitelist token mapping data 130 may ensure that such strings are detokenized in search results.

At 1010, a request may be made for token(s) corresponding to common portions of message or log strings generated by processes executing within the trusted computing environment 102. Such a request may be made to the trusted server device(s) 108, and may request that the token(s) corresponding to the hostnames or other identifying information be retrieved from the token mapping datastore 112. At 1012, the whitelist token mapping data 130 may be updated to include token mappings for the common strings portions. In some cases, words or other portions of message strings may be frequently generated by a logging framework used by applications and processes executing in the trusted computing environment 102. For example, applications written in the Java® programming language may employ the Java® logging framework, which may frequently write strings such as "Connection error" to log files or log data streams, as shown in FIG. 4. By adding the strings or the words included in the strings to the whitelist token mapping data 130, implementations may ensure that the strings are detokenized in search results. Generic or common error, warning, or alert messages may also be added to the whitelist token mapping data 130. In some cases, the commonly occurring strings in log files or log data streams may be determined by scraping or otherwise analyzing the source code of programs executing in the trusted computing environment 102.

In some implementations, an automatic or manual process may periodically examine the whitelist token mapping data 130 to ensure that sensitive strings or words have not been inadvertently added to the whitelist token mapping data 130. For example, a process may periodically perform a check based on the Luhn algorithm, or the mod 10 algorithm, to determine whether any of the strings in the whitelist token mapping data 130 include numbers that may be credit card numbers. If any such strings are found, they may be removed from the whitelist token mapping data 130. Implementations also support other types of checks to identify potentially sensitive information in the whitelist token mapping data 130.

In some implementations, the requests for token mapping data at 1002, 1006, and 1010 may be subject to at least some of the security controls described with reference to FIG. 11.

Figure 11:
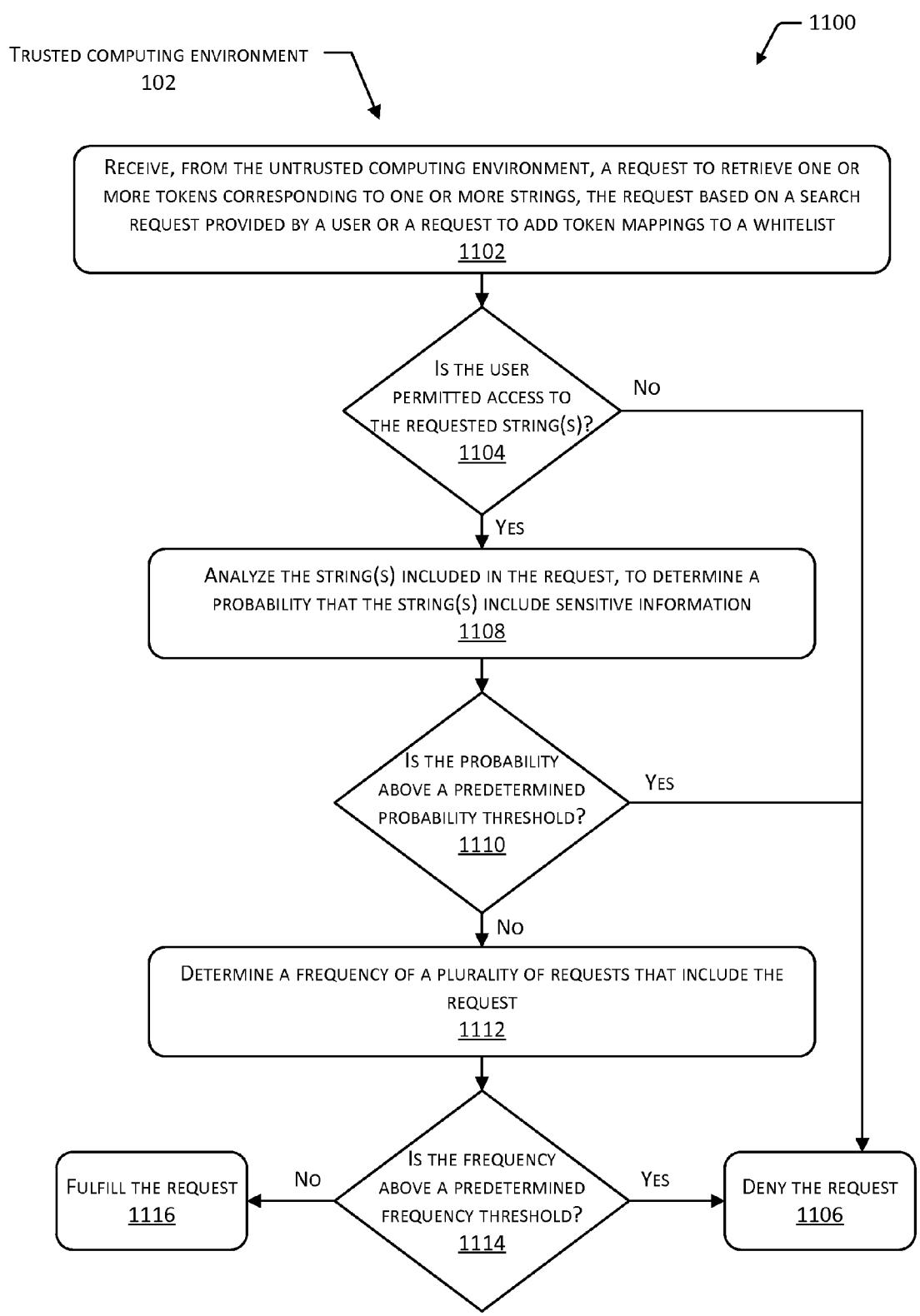
FIG. 11 depicts a flow diagram of a process for controlling access to token mapping data stored in the trusted computing environment.

FIG. 11 depicts a flow diagram 1100 of a process for controlling access to the token mapping data 114 stored in the trusted computing environment 102. Operations of the process may be performed by the tokenization module 110, the access control module 216, or other modules executed by the trusted server device(s) 108.

At 1102, a request to retrieve one or more tokens corresponding to one or more words or strings may be received from a process executing in the untrusted computing environment 104. In some cases, the request may include one or more search terms included in a search request entered by a user to the search module 124, as described above with reference to FIG. 9. Alternatively, the request may include one or more strings that are requested for addition to the whitelist token mapping data 130, as described above with reference to FIG. 10. The request may include an identification of a user associated with the request, such as the user requesting the search through the search module 124.

At 1104, a determination may be made whether the user is permitted access to the requested strings. Such a determination may be made based on the access control data 224, or other information indicating user permissions. In some cases, access to token mapping data 114 for the requested strings may be based on access permissions granted to individual users or groups of users. For example, different users may have different access permission levels that allow access to different sets of the token mapping data 114. The process may check whether the requesting user is permitted to access the requested token mapping data 114. If it is determined at 1104 that the user is not permitted to access the requested token mapping data, the process may proceed to 1106 and the request may be denied.

User permissions may be set individually for each user, may be set for groups of users such as departments or sub-organizations within a larger organization, or may be set for one or more users who have a particular role within an organization. User permissions may also be based on particular resources such as particular servers or processes operating within the trusted computing environment 102. For example, one or more users may be permitted access to token information for strings or words generated by processes executing on hosts to which those users are permitted access. Implementations support user permissions based on any combination of user identify, user group affiliation, user role, or user resource access.

If it is determined at 1104 that the user is permitted access, then the process may proceed to 1108. At 1108, the search terms may be analyzed to determine whether they include sensitive information. Such analysis may include applying regular expression analysis or pattern analysis (e.g., a Luhn or mod 10 algorithm) to determine a probability that the search terms include sensitive information such as credit card number, social security numbers, and so forth. At 1110, if the probability determined at 1108 is above a predetermined threshold probability, the process may proceed to 1106 and deny the request. If the probability is not above the predetermined threshold, the process may proceed to 1112.

At 1112, a determination may be made of a frequency of a plurality of requests that include the request received at 1102. At 1114, if the frequency determined at 1112 is above a predetermined threshold frequency, the process may proceed to 1106 and deny the request. In some implementations, requests may be denied if they are received at a frequency that is higher than expected for users manually entering search terms into the search module 124. If the trusted server device 108 receives requests at a high frequency, an inference may be made that the requests are coming from an automated process that is attempting (e.g., by brute force) to discern token mappings for sensitive information by sending a large number of requests. Such requests may be denied.

If it is determined at 1114 that the frequency is not above the predetermined frequency threshold, the process may proceed to 1116 and fulfill the request by sending the requested token mapping data 114 to the untrusted computing environment 104. Implementations may perform one or more of the security controls described above with regard to user access permissions evaluated at 1104, the search term analysis evaluated at 1110, and the request frequency analysis evaluated at 1114, in any combination and in any order. Implementations may also support other types of analyses to evaluate requests made from the untrusted computing environment 104 for token mapping data 114.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors.

Separate instances of these programs may be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method, comprising:
in a trusted computing environment, parsing a file to determine a plurality of words included in the file, based on whitespace characters that separate the words in the file, the file comprising one or more sensitive words corresponding to financial account data;
for individual words that are unique in the plurality of words, determining a corresponding token that corresponds to the word, such that the word is not derivable from the token;
generating a tokenized file that includes corresponding tokens in place of the plurality of words;
storing the tokenized file in an untrusted computing environment;
in the trusted computing environment, storing a mapping of the plurality of words to the corresponding tokens; and
in the untrusted computing environment:
storing a whitelist mapping of a subset of the plurality of words to the corresponding tokens, the subset including non-sensitive words other than the one or more sensitive words;
receiving a search request including one or more search terms;
for the one or more search terms that are included in the whitelist, retrieving the corresponding token;
for the one or more search terms that are not included in the whitelist, sending a request that the trusted computing environment retrieve the corresponding token;
based at least in part on one or more tokens corresponding to the one or more search terms, perform a search of the tokenized file stored in the untrusted computing environment;
identifying one or more tokens in the tokenized file that are included in the whitelist;
replacing the identified one or more tokens with one or more corresponding words from the whitelist, to generate partly detokenized information; and
providing the partly detokenized information in response to the search request.

2. The method of claim 1, further comprising:
receiving identification of the a user associated with the search request; and
determining, based on access control data, whether the user is permitted access to the one or more search terms included in the search request.

3. The method of claim 1, wherein the determining of the token is based on a random or pseudo-random number generation algorithm.

4. The method of claim 1, wherein the determining of the token includes generating the token as an ordinal value that is incremented or decremented for each unique word in the plurality of words.

5. A system, comprising:
a token mapping datastore storing token mapping data that associates a plurality of strings with corresponding tokens, the token mapping datastore included in a first computing environment associated with a first trust level;
a whitelist token mapping datastore storing whitelist token mapping data that associates a subset of the plurality of strings with the corresponding tokens, the whitelist token mapping datastore included in a second computing environment associated with a second trust level;
a first computing device in communication with the token mapping datastore, the first computing device configured to execute a first set of computer-readable instructions that cause the first computing device to:
generate tokenized information that includes one or more tokens that correspond to one or more strings of the plurality of strings;
send the tokenized information to be stored in the second computing environment; and
a second computing device in communication with the first computing device and the whitelist token mapping datastore, the second computing device configured to execute a second set of computer-readable instructions that cause the second computing device to:
receive a search request including one or more search terms;
for the one or more search terms that are included in the whitelist token mapping data, retrieve the corresponding token from the whitelist token mapping datastore;
for the one or more search terms that are not included in the whitelist token mapping data, send a request that the first computing device retrieve the corresponding token from the token mapping datastore;
based at least in part on one or more tokens corresponding to the one or more search terms, perform a search for the tokenized information stored in the second computing environment;
identify one or more tokens in the tokenized information that are included in the whitelist token mapping data;
replace the identified one or more tokens with one or more corresponding strings from the whitelist token mapping data, to generate partly detokenized information; and
provide the partly detokenized information in response to the search request.

6. The system of claim 5, the first set of computer-readable instructions further comprising instructions that cause the first computing device to:
parse information in the first computing environment to determine the one or more of the plurality of strings based on separation by one or more whitespace characters; and
for individual strings that are unique in the one or more strings, determine a token that corresponds to the string, based at least partly on the token mapping data in the token mapping datastore.

7. The system of claim 5, wherein:
the token mapping datastore includes the token mapping data for one or more of the plurality of strings that include sensitive data; and
the whitelist token mapping datastore includes the whitelist token mapping data for one or more of the subset of the plurality of strings that do not include the sensitive data.

8. The system of claim 5, wherein:
the search request further comprises a search range in dates, times, or both dates and times;
the tokenized information includes timestamp data describing when the tokenized information was created; and
the search includes a search for a version of the tokenized information having a timestamp within the search range.

9. The system of claim 5, the second computing device further configured to:
for the one or more search terms that are not included in the whitelist token mapping data, modify the whitelist token mapping data to include an association of the search term with the corresponding token retrieved from the token mapping datastore.

10. The system of claim 5, the first computing device further configured to:
receive, from the second computing device, the request that the first computing device retrieve the corresponding token from the token mapping datastore;
analyze the one or more search terms included in the request, to determine a probability that the one or more search terms include sensitive information; and
deny the request, based on the probability exceeding a predetermined threshold probability.

11. The system of claim 5, the first computing device further configured to:
receive, from the second computing device, the request that the first computing device retrieve the corresponding token from the token mapping datastore;
determine a frequency of a plurality of requests that include the request; and
deny the request, based on the frequency exceeding a predetermined threshold frequency.

12. The system of claim 5, the first computing device further configured to:
receive, from the second computing device, the request that the first computing device retrieve the corresponding token from the token mapping datastore, the request including an identification of a user associated with the search request, the request including the one or more search terms that are not included in the whitelist token mapping data;
determine whether the user is permitted access to the one or more search terms included in the request, based on access control data; and
deny the request, based on a determination that the user is not permitted access to the one or more search terms.

13. The system of claim 5, the first computing device further configured to:
based on a determination that the token mapping data does not include the string, generate a new token that is non-derivable based on the string, the new token being generated based on:
a random number generation algorithm;
a pseudo-random number generation algorithm; or
an ordinal value that is incremented or decremented for each string included the token mapping data; and
modify the token mapping data in the token mapping datastore to include an association of the string with the new token.

14. The system of claim 5, further comprising:
the second computing device in communication with the first computing device and the whitelist token mapping datastore, the second computing device configured to execute a second set of computer-readable instructions that cause the second computing device to:
send, to the first computing device, a request for one or more tokens corresponding to one or more strings, the one or more strings including one or more of:
one or more hostnames of one or more computing devices in the first computing environment;
one or more usernames of one or more users; or
one or more common portions of message strings generated by one or more processes that execute in the first computing environment;
receive, from the first computing device, the one or more tokens corresponding to the one or more strings; and
populate the whitelist token mapping data with the one or more strings mapped to the one or more corresponding tokens.

15. A system, comprising:
a token mapping datastore storing token mapping data that associates a plurality of strings with corresponding tokens, wherein the token mapping datastore is included in a first computing environment associated with a first trust level;
a whitelist token mapping datastore storing whitelist token mapping data that associates a subset of the plurality of strings with the corresponding tokens, wherein the whitelist token mapping datastore is included in a second computing environment associated with a second trust level;
a first computing device in communication with the token mapping datastore, the first computing device configured to execute computer-readable instructions that cause the first computing device to:
generate tokenized information that includes one or more tokens that correspond to one or more strings of the plurality of strings; and
send the tokenized information to be stored in the second computing environment; and
a second computing device in communication with the first computing device and the whitelist token mapping datastore, the second computing device configured to execute computer-readable instructions that cause the second computing device to:
receive a search request to search for a file that includes one or more search terms;
for the one or more search terms that are included in the whitelist token mapping data, retrieve the corresponding token from the whitelist token mapping datastore;
for the one or more search terms that are not included in the whitelist token mapping data, send a request that the first computing device retrieve the corresponding token from the token mapping datastore;
search for a tokenized version of the file that includes the one or more tokens corresponding to the one or more search terms;
identify, in the tokenized version of the file, one or more tokens that are included in the whitelist token mapping data;
replace the identified one or more tokens with the corresponding string from the whitelist token mapping data, to generate an at least partly detokenized version of the file; and
provide the at least partly detokenized version of the file in response to the search request.

16. The system of claim 15, wherein:
the token mapping datastore includes the token mapping data for one or more of the plurality of strings that include sensitive data; and
the whitelist token mapping datastore includes the whitelist token mapping data for one or more of the plurality of strings that do not include the sensitive data.

17. The system of claim 15, wherein:
the search request further comprises a search range in dates, times, or both dates and times;
the tokenized file includes timestamp data describing when the tokenized file was created; and
the searching for the tokenized version of the file includes searching for the tokenized version of the file having a timestamp within the search range.

18. The system of claim 15, the first computing device further configured to execute computer-readable instructions that cause the first computing device to:
- generate a token that is non-derivable from the one or more strings of the plurality of strings based on one or more of:
  - a random number generation algorithm;
  - a pseudo-random number generation algorithm; or
  - an ordinal value that is incremented or decremented for each string included the token mapping data.

19. The system of claim 15, the first computing device further configured to:
- receive, from the second computing device, the request to retrieve the corresponding token from the token mapping datastore, the request including an identification of a user associated with the search request, the request including the one or more search terms that are not included in the whitelist token mapping data;
- determine whether the user is permitted access to the one or more search terms included in the request, based on access control data; and
- deny the request, based on a determination that the user is not permitted access to the one or more search terms.

20. The system of claim 15, wherein the tokens included in the token mapping data and in the whitelist token mapping data have a same size.

* * * * *